United States Patent
Cowan et al.

(10) Patent No.: US 9,229,859 B2
(45) Date of Patent: Jan. 5, 2016

(54) MAPPING NON-PREFETCHABLE STORAGE LOCATIONS INTO MEMORY MAPPED INPUT/OUTPUT SPACE

(75) Inventors: Joe P. Cowan, Fort Collins, CO (US); Kamran H. Casim, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 948 days.

(21) Appl. No.: 13/259,127

(22) PCT Filed: Sep. 25, 2009

(86) PCT No.: PCT/US2009/058433
§ 371 (c)(1),
(2), (4) Date: Sep. 22, 2011

(87) PCT Pub. No.: WO2011/037576
PCT Pub. Date: Mar. 31, 2011

(65) Prior Publication Data
US 2012/0030401 A1 Feb. 2, 2012

(51) Int. Cl.
*G06F 3/00* (2006.01)
*G06F 9/26* (2006.01)
*G06F 12/06* (2006.01)

(52) U.S. Cl.
CPC ..... *G06F 12/06* (2013.01); *G06F 3/00* (2013.01); *G06F 2213/0026* (2013.01)

(58) Field of Classification Search
USPC ............. 710/3, 9, 10, 26, 105, 305, 306, 311, 710/313, 315; 711/202, 209, 212
See application file for complete search history.

(56) References Cited

U.S. PATENT DOCUMENTS

| | | | |
|---|---|---|---|
| 5,860,142 A | 1/1999 | Cepulis | |
| 6,301,631 B1 | 10/2001 | Chambers et al. | |
| 2002/0073258 A1 | 6/2002 | Riley et al. | |
| 2003/0188076 A1 | 10/2003 | Bronson et al. | |
| 2006/0248282 A1 | 11/2006 | Rostampour et al. | |
| 2006/0253619 A1* | 11/2006 | Torudbakken et al. | 710/31 |
| 2008/0215822 A1* | 9/2008 | Ajanovic et al. | 711/146 |
| 2010/0161912 A1* | 6/2010 | Daniel | 711/147 |
| 2010/0211714 A1* | 8/2010 | LePage | 710/310 |

OTHER PUBLICATIONS

PCI Express to PCI-X Bridge Architecture: Where Interface Standards Meet, Intel, 2003.*
PCI Express Basics & Applications in Communication Systems, Akber Kazmi, PLX Technology, 2004.*
Method of Eliminating Limiting Requirements for IO & MMIO Windows of a PCI-to-PCI Bridge in a Root Port of a PCIe Root Complex, IP.com Journal, IP.com Inc., West Henrietta, NY, US, Jul. 11, 2006.
International Search Report, PCT/US2009/058433, Jun. 22, 2010, 10 pages.

* cited by examiner

*Primary Examiner* — Khanh Dang
(74) *Attorney, Agent, or Firm* — Dicke, Billig & Czaja, PLLC

(57) ABSTRACT

A system including a host and a device. The device has at least one non-prefetchable storage location. The host and the device are configured to map the at least one non-prefetchable storage location into memory mapped input/output space that is addressed via greater than 32 address bits.

15 Claims, 3 Drawing Sheets

MAPPING NON-PREFETCHABLE STORAGE LOCATIONS INTO MEMORY MAPPED INPUT/OUTPUT SPACE

BACKGROUND

Typically, a computer system includes a number of integrated circuits that communicate with one another to perform system applications. Often, the computer system includes one or more host controllers and one or more electronic subsystem assemblies. To perform system functions, the host controller(s) and subsystem assemblies communicate via communication links, such as parallel communication links and serial communication links. Parallel communication links include links that implement conventional peripheral component interconnect (PCI), which is part of the PCI Local Bus standard, and PCI eXtended (PCI-X). Serial communication links include links that implement the PCI Express (PCIe) standard.

Conventional PCI is a bus for attaching hardware devices in a computer. The devices can take the form of an integrated circuit fitted onto the motherboard or an expansion card that fits into a slot. Typical PCI cards include: network cards, sound cards, modems, extra ports, television tuner cards, and disk controllers.

PCI-X is a bus and expansion card standard that enhances the PCI Local Bus standard for higher bandwidth demanded by servers. PCI-X revised the conventional PCI standard by doubling the maximum clock speed, from 66 MHz to 133 MHz. The theoretical maximum amount of data exchanged between the processor and peripherals with PCI-X is 1.06 GB/s, compared to 133 MB/s with standard PCI. Conventional PCI and PCI-X have largely been replaced by PCIe, which features a different logical design.

PCIe is used in consumer, server, and industrial applications as a motherboard-level interconnect to link motherboard-mounted peripherals and as an expansion card interface for add-in boards. A difference between PCIe and the earlier buses is a topology based on point-to-point serial links, rather than a shared parallel bus. PCIe is a high-speed, serial link that communicates data via differential signal pairs. A PCIe link is built around a bidirectional, serial, point-to-point connection referred to as a lane. At the electrical level, each lane utilizes two unidirectional low voltage differential signaling pairs, a transmit pair and a receive pair, for a total of four data wires per lane. A connection between any two PCIe devices is referred to as a link, and is built up from a collection of one or more lanes. All PCIe devices minimally support single-lane (x1) links. PCIe devices may optionally support wider links composed of x2, x4, x8, x12, x16, x32, or more lanes.

Typically, PCIe devices have storage locations, such as registers and memory locations, mapped into PCIe memory space, also referred to as memory mapped input/output (MMIO) space. Often, the MMIO space includes a portion addressable via 32-bit addresses and a portion addressable via 64-bit addresses. The portion addressable via 32-bit addresses, which addresses less than four giga-bytes (GB) of memory space, is referred to as LMMIO. The portion addressable via 64-bit addresses, which addresses greater than four GB of memory space, is referred to as GMMIO. The mapping resources in bridges and switches are defined to associate LMMIO space with non-prefetchable semantics, and GMMIO space with prefetchable semantics.

PCIe devices are requesting an increasingly large amount of non-prefetchable MMIO space. On highly scalable platforms that support a large number of PCIe devices, this can lead to a shortage of LMMIO space, which limits the number of devices that can be supported.

For these and other reasons there is a need for the present invention.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
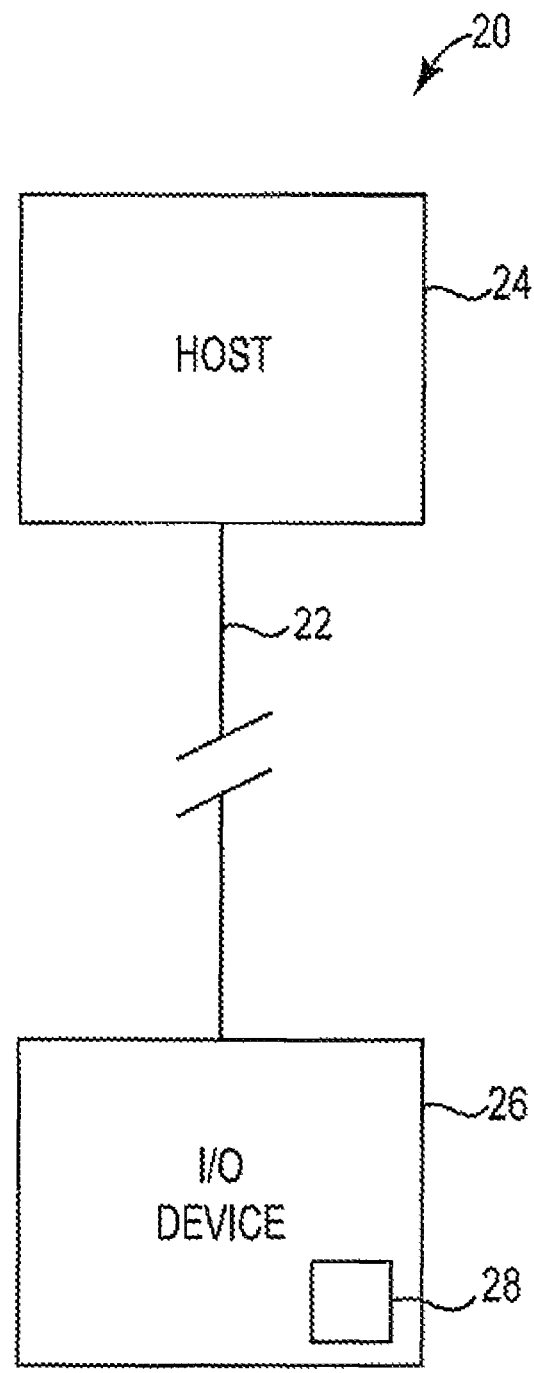
FIG. 1 is a diagram illustrating one embodiment of a system including a PCIe link.

FIG. 1 is a diagram illustrating one embodiment of a system 20 including a PCIe link 22. System 20 includes a host 24 and an input/output (I/O) device 26 that includes at least one non-prefetchable storage location 28. Host 24 and I/O device 26 are configured to map the at least one non-prefetchable storage location 28 into memory space addressed via greater than 32 address bits, which is in GMMIO space and historically used for only prefetchable storage locations. In one embodiment, host 24 includes one or more microprocessors that execute software, firmware, and/or operating system instructions to provide these system functions. In one embodiment, I/O device 26 includes one or more microprocessors that execute software, firmware, and/or operating system instructions to provide these system functions.

Host 24 is electrically coupled to I/O device 26 via PCIe link 22. In one embodiment, host 24 is electrically coupled directly to I/O device 26 via PCIe link 22, i.e., without any intervening PCIe-to-PCIe switches, referred to herein as switches, and without any PCIe-to-PCI/PCI-X bridges, referred to herein as bridges. In one embodiment, host 24 is electrically coupled to I/O device 26 via PCIe link 22 and one or more switches, where host 24 is coupled to one side of a switch and I/O device 26 is coupled to the other side of the switch. In one embodiment, host 24 is electrically coupled to I/O device 26 via one or more bridges, where host 24 is coupled to one side of a bridge and I/O device 26 is coupled to the other side of the bridge.

In PCIe protocol, as opposed to conventional PCI protocol, all memory read requests include an explicit payload byte count value in the header. Thus, a PCIe memory read will not prefetch data as long as the entire path from requestor to completer is over PCIe. This characteristic, as well as certain other characteristics of PCIe switches, make it safe to map non-prefetchable storage locations into GMMIO space, whereas it would not be safe to do so with conventional PCI protocol and conventional PCI bridges. PCI-X protocol includes explicit payload byte counts in some of its memory read requests, but not all, and PCI-X bridges lack certain characteristics that make it safe to map non-prefetchable storage locations into GMMIO space.

With PCIe host systems, two conditions are sufficient in order to safely map the at least one non-prefetchable storage location 28 into GMMIO. One condition for mapping is that host 24 and I/O device 26 are not coupled to one another via one or more intervening PCI or PCI-X bridges. The other condition for mapping is that PCI or PCI-X devices below a bridge are prohibited from doing peer-to-peer requests to non-prefetchable storage locations mapped into GMMIO space of PCIe I/O devices.

The first condition reduces or eliminates problems associated with a bridge, i.e. a bridge that operates PCI or PCI-X on at least one side of the bridge, and bridges below that bridge. Problems reduced or eliminated via the first condition include bridges doing byte-merging of memory writes, which may corrupt non-prefetchable storage locations in GMMIO, prefetching in PCI or PCI-X reads that have no explicit byte count, introducing silent data corruption due to discarding delayed completions in PCI mode, and bridge behavior that is ill-defined with respect to zero length memory reads.

The second condition reduces or eliminates problems associated with peer-to-peer requests, such as blind prefetching for memory reads.

Both of these conditions are met if there are no PCI or PCI-X devices in system 20. In one embodiment, system policy states that I/O devices are prohibited from being coupled to PCIe link 22 via a bridge. In one embodiment, host 24 determines that no bridges are in system 20, thus host 24 can map the at least one non-prefetchable storage location 28 into GMMIO space.

These two conditions can also be met individually. Where, as to the first condition, host 24 determines whether I/O device 26 is coupled to host 24 via one or more intervening bridges. If host 24 is coupled to I/O device 26 via one or more intervening bridges, host 24 does not map the at least one non-prefetchable storage location into GMMIO space, i.e., mapping of the at least one non-prefetchable storage location into GMMIO is prohibited. If host 24 is coupled directly to I/O device 26 or if host 24 is coupled to I/O device 26 via one or more switches, the first condition is met. As to the second condition, in one embodiment, system policy states that I/O devices below a bridge are prohibited from doing peer-to-peer requests.

System 20 can map one or more non-prefetchable storage locations into memory space addressed via greater than 32 address bits, i.e., GMMIO space. Mapping non-prefetchable storage locations into GMMIO eases the burden on LMMIO and increases the number of devices that can be attached to a PCIe system.

Figure 2:
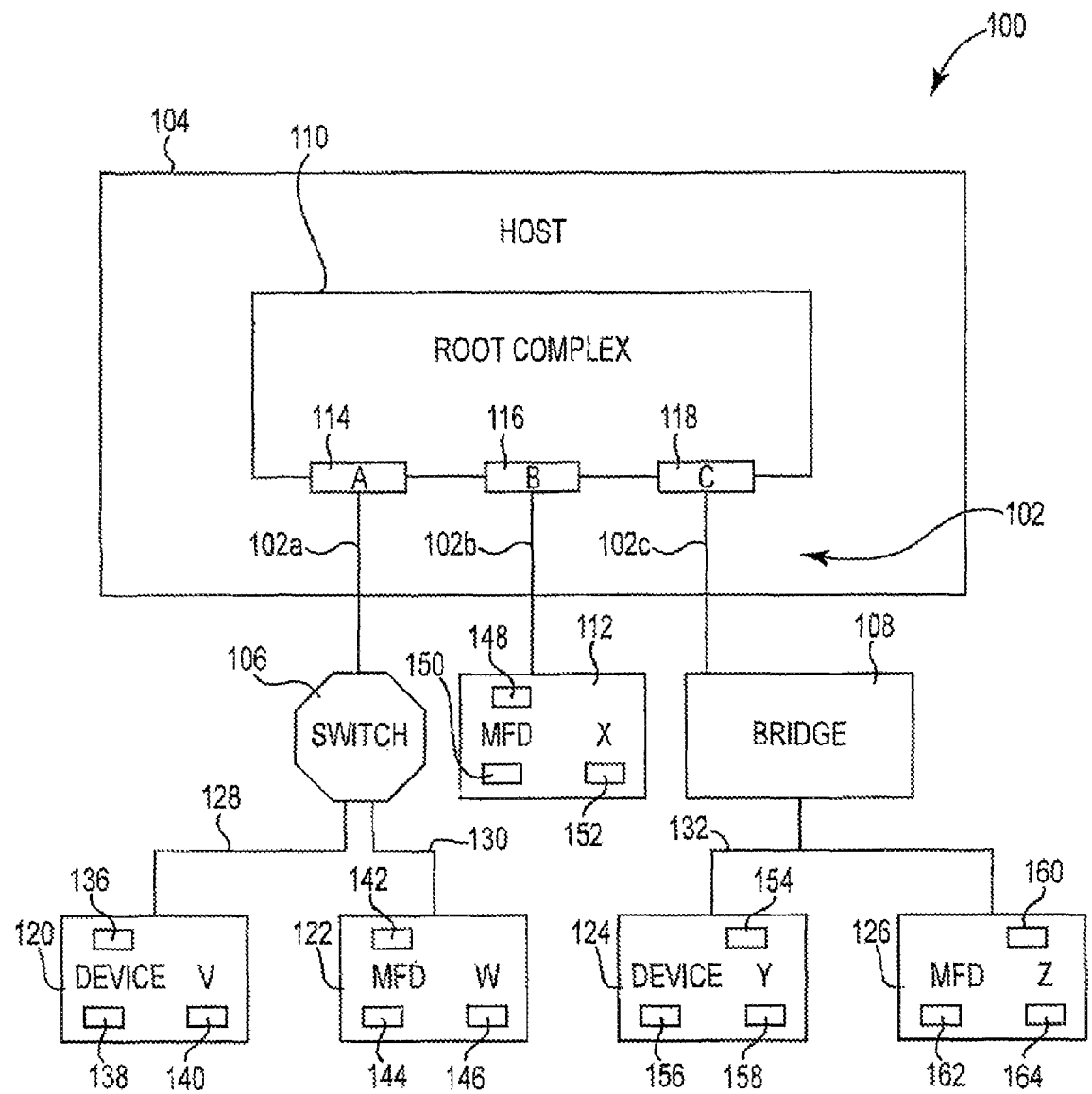
FIG. 2 is a diagram illustrating one embodiment of a system including a PCIe link and a host coupled to a switch, a bridge, and a number of devices and multi-function devices (MFDs).

FIG. 2 is a diagram illustrating one embodiment of a system 100 including PCIe links at 102. System 100 includes a host 104 coupled to a switch 106, a bridge 108, and a number of devices and multi-function devices (MFDs). As previously described, switch 106 refers to a PCIe-to-PCIe switch and bridge 108 refers to a PCIe-to-PCI/PCI-X bridge. Also, in one aspect, host 104 is similar to host 24 and each of the devices and MFDS is similar to I/O device 26.

Host 104 includes a root complex 110 that interfaces between host 104 and switch 106, between host 104 and bridge 108, and between host 104 and MFD X at 112. Root complex 110 includes root port A at 114, root port B at 116, and root port C at 118. Root complex 110 is electrically coupled to switch 106 via root port A at 114 and the PCIe link at 102a, root complex 110 is electrically coupled to MFD X at 112 via root port B at 116 and the PCIe link at 102b, and root complex 110 is electrically coupled to bridge 108 via root port C at 118 and the PCIe link at 102c.

System 100 includes device V at 120, MFD W at 122, device Y at 124, and MFD Z at 126. Host 104' is coupled to device V at 120 and MFD W at 122 via switch 106. Where, one side of switch 106 is electrically coupled to root port A at 114 via PCIe link 102a and the other side of switch 106 is electrically coupled to device V at 120 via link 128 and to MFD W at 122 via link 130. Host 104 is coupled to device Y at 124 and MFD Z at 126 via bridge 108. Where, one side of bridge 108 is electrically coupled to root port C at 118 via PCIe link 102c and the other side of bridge 108 is electrically coupled to device Y at 124 via bus 132 and to MFD Z at 126 via bus 132.

Device V at 120, MFD W at 122, MFD X at 112, device Y at 124, and MFD Z at 126 each include base address registers, prefetchable storage locations, and non-prefetchable storage locations. Device V at 120 includes base address registers 136, prefetchable storage locations 138, and non-prefetchable storage locations 140. MFD W at 122 includes base address registers 142, prefetchable storage locations 144, and non-prefetchable storage locations 146. MFD X at 112 includes base address registers 148, prefetchable storage locations 150, and non-prefetchable storage locations 152. Device Y at 124 includes, base address registers 154, prefetchable storage locations 156, and non-prefetchable storage locations 158. MFD Z at 126 includes base address registers 160, prefetchable storage locations 162, and non-prefetchable storage locations 164.

Host 104 and root complex 110 map prefetchable storage locations 138, 144, 150, 156, and 162 and non-prefetchable storage locations 140, 146, 152, 158, and 164 into PCIe memory space, referred to as MMIO space. This MMIO space includes a portion addressable via 32-bit addresses, which addresses less than four giga-bytes (GB) of memory space and is referred to as LMMIO space, and a portion addressable via 64-bit addresses, which addresses greater than four GB of memory space and is referred to as GMMIO space.

Host 104 and root complex 110 map the prefetchable storage locations 138, 144, 150, 156, and 162 into GMMIO and the non-prefetchable storage locations 140, 146, and 152 into LMMIO or GMMIO. Host 104 and root complex 110 map the non-prefetchable storage locations 158 and 164 into LMMIO.

The two conditions previously described are sufficient in order to safely map non-prefetchable storage locations into GMMIO. First, host 104 and the device or MFD with the non-prefetchable storage location(s) to be mapped into GMMIO cannot be coupled to one another via one or more intervening bridges, such as bridge 108. Second, devices and MFDs below a bridge, such as device Y at 124 and MFD Z at 126 below bridge 108, are prohibited from doing peer-to-peer requests to non-prefetchable storage locations in GMMIO space.

The first condition reduces or eliminates potential problems associated with a bridge, i.e. a bridge that operates PCI or PCI-X on one side, and bridges below a bridge. Potential problems reduced or eliminated include bridges doing byte-merging of memory writes, which may corrupt non-prefetchable storage locations in GMMIO, prefetching in PCI or PCI-X reads that have no explicit byte count, introducing silent data corruption due to discarding delayed completions in PCI Mode, and bridge behavior that is ill-defined with respect to zero length memory reads. The second condition reduces or eliminates potential problems associated with peer-to-peer requests, such as blind prefetching for memory reads. If these two conditions are met, host 104 and root complex 110 can safely map non-prefetchable storage locations into memory space addressed via greater than 32 address bits, which is GMMIO space.

In one embodiment, host 104 and root complex 110 include one or more microprocessors that execute software, firmware, and/or operating system instructions to provide these system functions. In one embodiment, one or more of the devices and MFDs, including device V at 120, MFD W at 122, MFD X at 112, device Y at 124, and MFD Z at 126, include one or more microprocessors that execute software, firmware, and/or operating system instructions to provide these system functions.

In one embodiment, to meet both conditions, devices and MFDs are prohibited from being coupled to PCIe link 102 via a bridge, such as bridge 108. In one embodiment, to meet both conditions, bridges, such as bridge 108, are prohibited from being coupled to PCIe link 102. In one embodiment, to meet both conditions, host 104 determines whether a bridge, such as bridge 108, is in system 100 and if no bridges are in system 100, host 104 can safely map one or more non-prefetchable storage locations into GMMIO.

To meet the first condition, host 104 determines whether a device or MFD, such as device V at 120, MFD W at 122, MFD X at 112, device Y at 124, and MFD Z at 126, is coupled to host 104 via one or more intervening bridges. If host 104 is coupled to the device or MFD in question via one or more intervening bridges, host 104 does not map non-prefetchable storage locations from that device or MFD into GMMIO, i.e., mapping of non-prefetchable storage locations from that device or MFD into GMMIO is prohibited. If host 104 is coupled directly to the device or MFD, or if host 104 is coupled to the device or MFD via one or more switches, the first condition is met.

In system 100, host 104 determines that device V at 120 and MFD W at 122 is coupled to host 104 via switch 106, and that MFD X at 112 is coupled directly to host 104, i.e. without an intervening switch or bridge. Also, host 104 determines that each of device Y at 124 and MFD Z at 126 is coupled to host 104 via intervening bridge 108. Thus, as to device V at 120, MFD W at 122, and MFD X at 112, the first condition is met and mapping of non-prefetchable storage locations 140, 146, and 152 into GMMIO depends on the second condition being met. As to device Y at 124 and MFD Z at 126, the first condition is not met and host 104 does not map non-prefetchable storage locations 158 and 164 into GMMIO.

As to the second condition, in system 100 system policy states that devices or MFDs below a bridge, such as device Y at 124 and MFD Z at 126 below bridge 108, are prohibited from doing peer-to-peer requests. Thus, the second condition is met and host 104 can map non-prefetchable storage locations 140, 146, and 152 into GMMIO.

To map prefetchable and non-prefetchable storage locations into LMMIO and GMMIO, host 104 programs base address registers 136, 142, 148, 154, and 160. Base address registers for mapping LMMIO are 32-bits in length and base address registers for mapping GMMIO are 64-bits in length. To map non-prefetchable storage locations 140, 146, and 152 into GMMIO, host 104 provides 64-bit addresses that are programmed into the 64-bit base address registers.

Figure 3:
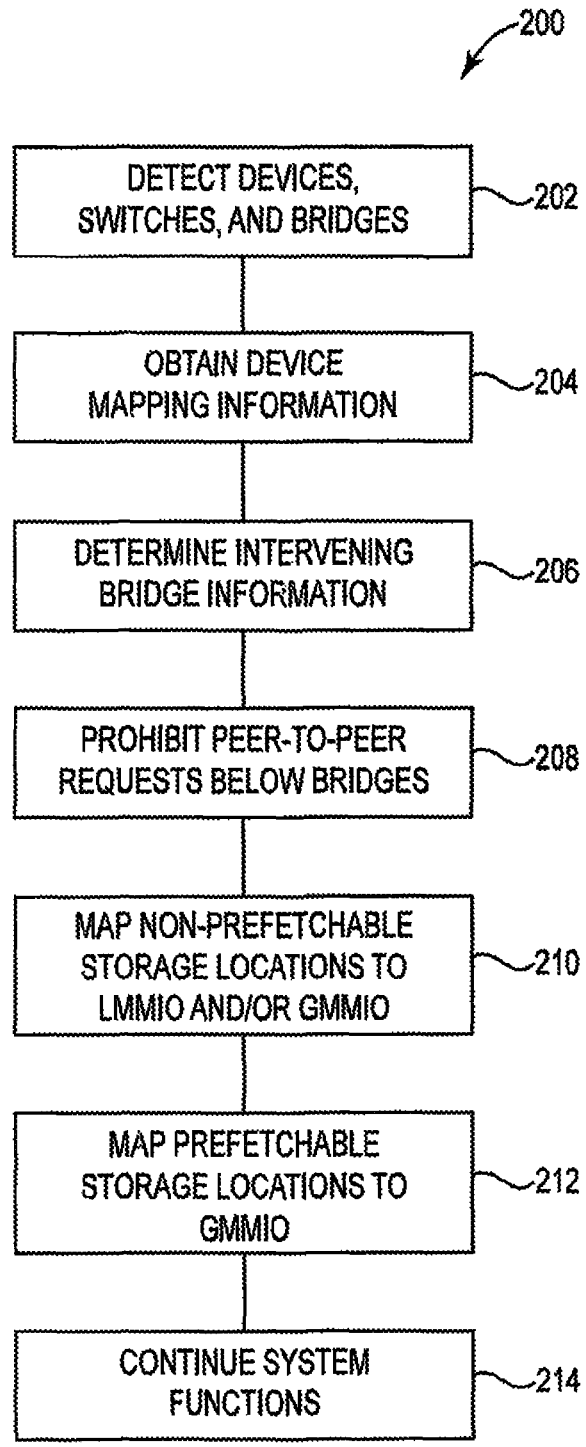
FIG. 3 is a diagram illustrating one embodiment of a method for mapping device storage locations into PCIe memory space.

FIG. 3 is a diagram illustrating one embodiment of a method 200 for mapping device storage locations into PCIe memory space in system 100. At 202, host 104 detects devices, switches, and bridges on PCIe links 102*a*, 102*b*, and 102*c*. Host 104 detects device V at 120, MFD W at 122, MFD X at 112, device Y at 124, and MFD Z at 126. Also, host 104 detects switch 106 and bridge 108.

At 204, host 104 gathers information about non-prefetchable and prefetchable storage locations to be mapped into PCIe memory space. Device V at 120 provides prefetchable storage locations 138 and non-prefetchable storage locations 140 to host 104. MFD W at 122 provides prefetchable storage locations 144 and non-prefetchable storage locations 146 to host 104. MFD X at 112 provides prefetchable storage locations 150 and non-prefetchable storage locations 152 to host 104. Device Y at 124 provides prefetchable storage locations 156 and non-prefetchable storage locations 158 to host 104, and MFD Z at 126 provides prefetchable storage locations 162 and non-prefetchable storage locations 164 to host 104.

At 206, host 104 determines whether each of the devices, including device V at 120, MFD W at 122, MFD X at 112, device Y at 124, and MFD Z at 126, is coupled to host 104 via an intervening bridge, such as bridge 108. This is one condition to be met for mapping non-prefetchable storage locations into GMMIO. In system 100, host 104 determines that device Y at 124 and MFD Z at 126 are each coupled to host 104 via intervening bridge 108. As a result, host 104 does not map non-prefetchable storage locations 158 and 164 to GMMIO. Host 104 also determines that device V at 120, MFD W at 122, and MFD X at 112 are not coupled to host 104 via an intervening bridge.

At 208, peer-to-peer requests from device Y at 124 and MFD Z at 126 are prohibited by system 100. In system 100 system policy states that devices or MFDs below a bridge, such as device Y at 124 and MFD Z at 126 below bridge 108, are prohibited from doing peer-to-peer requests. Thus, the second condition is met and host 104 can map non-prefetchable storage locations 140, 146, and 152 into GMMIO.

At 210 host 104 maps non-prefetchable storage locations 158 and 164 into LMMIO and non-prefetchable storage locations 140, 146, and 152 into LMMIO or GMMIO. At 212, host 104 maps prefetchable storage locations 138, 144, 150, 156, and 162 into GMMIO. At 214, system 100 continues with other system function.

System 20 and system 100 can map one or more non-prefetchable storage locations into memory space addressed via greater than 32 address bits, i.e., GMMIO space. Mapping non-prefetchable storage locations into GMMIO eases the burden on LMMIO space and increases the number of devices that can be mapped to PCIe memory space.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
    a serial communication link;
    a host coupled to the serial communication link; and
    a device coupled to the serial communication link having at least one non-prefetchable storage location, wherein the host and the device are configured to map the at least one non-prefetchable storage location into memory mapped input/output space that is addressed via greater than 32 address bits based on system policy that ensures one of:

1) no bridges are in the system; and
2) a) the device is coupled to the host without an intervening bridge, and b) devices below a bridge are prohibited from doing peer-to-peer requests.

2. The system of claim 1, wherein the host and the device are configured to determine whether the device is coupled to the host via an intervening bridge.

3. The system of claim 1, wherein the serial communication link comprises a peripheral component interconnect express link.

4. The system of claim 3, wherein a bridge is coupled to the peripheral component interconnect express link and the host and the device are configured to determine whether the device is below the bridge prior to mapping the at least one non-prefetchable storage location into the memory mapped input/output space.

5. The system of claim 3, wherein the host and the device are configured to map the at least one non-prefetchable storage location into peripheral component interconnect express memory mapped input/output space via a base address register.

6. The system of claim 5, wherein the base address register is a 64-bit base address register.

7. The system of claim 1, wherein system policy states that devices below a bridge are prohibited from doing peer-to-peer requests.

8. A system comprising:
a peripheral component interconnect express link;
a device coupled to the peripheral component interconnect express link and including a base address register that maps non-prefetchable storage locations in the device to peripheral component interconnect express memory space; and
a host coupled to the peripheral component interconnect express link, wherein the device and the host are configured to map at least one of the non-prefetchable storage locations to greater than four giga-bytes of memory mapped input/output space in the peripheral component interconnect express memory space based on system policy that ensures one of:
1) no bridges are in the system; and
2) a) the device is coupled to the host without an intervening bridge, and b) devices below a bridge are prohibited from doing peer-to-peer requests.

9. The system of claim 8, wherein the device and the host are configured to determine that the device is coupled to the host without an intervening bridge.

10. The system of claim 8, wherein system policy states that devices are prohibited from being coupled to the peripheral component interconnect express link via a bridge.

11. The system of claim 8, wherein system policy states that devices below a bridge are prohibited from doing peer-to-peer requests.

12. A method comprising:
mapping at least one non-prefetchable storage location of a device into peripheral component interconnect express memory space that is greater than four giga-bytes of memory mapped input/output space based on system policy that ensures one of:
1) no bridges are in the system; and
2) a) the device is coupled to the host without an intervening bridge, and b) devices below a bridge are prohibited from doing peer-to-peer requests.

13. The method of claim 12, comprising:
determining whether a host is coupled to the device via an intervening bridge.

14. The method of claim 12, comprising:
determining whether the device is coupled to a peripheral component interconnect express link via a bridge coupled to the peripheral component interconnect express link, prior to mapping the at least one non-prefetchable storage location into the peripheral component interconnect express memory space.

15. The method of claim 12, comprising:
prohibiting devices below a bridge from doing peer-to-peer requests.

* * * * *